Dec. 26, 1967   F. R. HAYS   3,360,450
METHOD OF MAKING CATHODE RAY TUBE FACE PLATES
UTILIZING ELECTROPHORETIC DEPOSITION
Filed Nov. 19, 1962   2 Sheets-Sheet 1

INVENTOR
FREDERICK R. HAYS
By J. Albert Hultquist
ATTORNEY

Dec. 26, 1967     F. R. HAYS     3,360,450
METHOD OF MAKING CATHODE RAY TUBE FACE PLATES
UTILIZING ELECTROPHORETIC DEPOSITION
Filed Nov. 19, 1962     2 Sheets-Sheet 2

INVENTOR
FREDERICK R. HAYS

By J. Albert Valtquist
ATTORNEY

United States Patent Office 3,360,450
Patented Dec. 26, 1967

3,360,450
METHOD OF MAKING CATHODE RAY TUBE FACE PLATES UTILIZING ELECTROPHORETIC DEPOSITION
Frederick R. Hays, Woodstock, Conn., assignor to American Optical Company, Southbridge, Mass., a voluntary association of Massachusetts
Filed Nov. 19, 1962, Ser. No. 238,395
6 Claims. (Cl. 204—181)

This invention relates generally to cathode ray tubes having face plates formed of a plurality of optical fibers bundled together in side-by-side mosaic fashion and has particular reference to improvements in luminescent screens for such face plates and method of making the same.

Fiber optical face plates are known to be highly efficient in transferring to the exterior optical images appearing on the screen provided on the inner side of the face plate. Conventional screens usually embody a continuous coating of energy-converting phosphor material. Spreading of each excitation spot produced in the screen as excited by the electron beam may cause simultaneous illumination of many fibers adjacent to a single one which should be the only one illuminated. This spreading of light into fibers other than the one intended to receive and convey the same from a particular electron excitation spot degrades the overall picture image produced by the screen so that, when transferred through the face plate, its resolution does not approach the fiber size of the face plate.

In accordance with principles of the present invention, means and method are provided to achieve full benefit of the exceptional image resolving powers of fiber optical type face plates. The invention contemplates the provision of luminescent screens so subdivided as to confine light produced by electron bombardment thereof to the area of the light receiving face of a particular optical fiber immediately adjacent each electron excitation spot.

The luminescent screen structure is formed as a plurality of individual deposits of energy-converting phosphor particles separated from one another and each positioned in accurately registered relation with a light-receiving end face of a particular fiber in the face plate.

In accordance with the principles of the present invention, individual deposits of the luminescent screen are produced by a relatively simple electrophoretic-photoresist technique. Thus, exceptionally compact and dense individually separated deposits of phosphor on the face plate structures can be made.

Accordingly, it is an object of the present invention to provide fiber optical face plates for cathode ray tubes or the like which have improved image resolving powers and novel method of making the same.

Another object is to provide a simple, expedient and economical process of electrophoretically forming a cathodoluminescent screen upon an optical face plate structure formed of optical fibers wherein said screen is composed of individual compactly formed phosphor deposits separated from one another and disposed respectively adjacent the light-receiving end faces of said fibers in registry therewith.

A further object is to provide novel means and method for rendering a surface of a fiber optical face plate structure electrically conductive and respective to the electrophoretic process of the invention substantially without affecting the optical properties of the structure.

Other objects and advantages of the invention will become apparent from the following description when taken in conjunction with the accompanying drawings in which.

Figure 1:
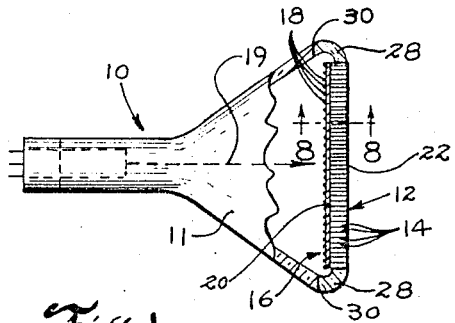
FIG. 1 is a side view, partially broken away, of a cathode ray tube having a fiber optical face plate structure embodying an aspect of the present invention.

Referring more particularly to the drawings wherein like reference characters designate like parts throughout the several views, there is illustrated diagrammatically in FIG. 1 cathode ray tube 10 which is provided with face plate 12 formed of an assembly of optical fibers 14 each having high index core and low index cladding. The face plate is provided with luminescent screen 16 comprised of a plurality of individual phosphor deposits 18 separated from one another and each disposed respectively adjacent the light-receiving end faces of fibers 14.

Screen 16 becomes luminous when bombarded as an electron beam indicated by arrow 19. Through the usual control of the trace pattern of beam 19 together with simultaneous control of the sequence of emission of electrons therein, a luminous picture image is produced by screen 16 on inner light-receiving side 20 of face plate 12. It is transferred by optical fibers 14 to the front or outwardly disposed light-emitting side 22 thereof for purposes of viewing. Photosensitive papers, films or plates or the like may be placed against side 22 to condition them for subsequent development and for "fixing."

Figure 2:
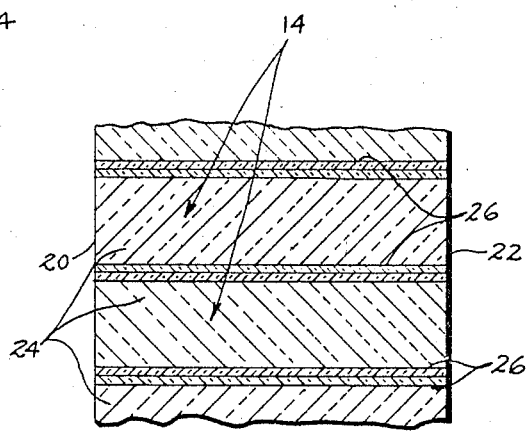
FIG. 2 is a greatly enlarged fragmentary cross-sectional view of the fiber optical structure of the cathode ray tube face plate.

In a preferred embodiment of the invention, optical fibers 14 each comprise core section 24 (see FIG. 2) formed of optical glass or the like of a relatively high index of refraction surrounded by relatively thin cladding 26 of material of relatively low index of refraction. By way of example, a typical fiber might embody core 24 of optical flint glass or the like having an index of refraction of approximately 1.75 and cladding 26 of crown or soda lime glass or the like having an index of refraction of approximately 1.52. Lanthanum containing glasses or barium containing glasses may be substituted for flint glass in the core. A lanthanum containing glass having an index of refraction of from approximately 1.69 to 1.80 would, for example, be suitable. Preferably the cladding thickness is in the neighborhood of $\frac{1}{10}$ the overall diameter of the fiber.

Fibers 14 may be of any desired cross-sectional size though it is preferred to choose a diameter in the range of from 6 to 8 microns. The selection of fiber size is made in accordance with the image resolving power desired of the face plate 12. Smaller fibers produce face plates having higher image resolving powers provided the fiber sizes are not so small as to approach the particular wavelength of light produced by the screen.

In forming face plate 12, fibers 14 are grouped together in intimate side-by-side relation and fused or otherwise joined along their respective sides in such a manner as to produce a vacuum-tight structure under the usual vacuum employed in cathode ray tube.

The fibers 14 may be circular, hexagonal, square or of any convenient cross-sectional shape since, as it will become apparent hereinafter, the cross-sectional configurations of the fibers 14 do not, in any way, affect the process of the invention relating to the fabrication of screen 16.

Screen 16 is formed upon face plate 12 before it is joined to envelope 11 of tube 10. In order that face plate 12 may be more easily joined to the tube envelope, it is preferably edge fused and/or glass soldered into glass annulus 28 or the like (see FIG. 1). Preferably annulus 28 has expansion and heat softening characteristics approximating those of the tube envelope. After having formed the phosphor screen 16 upon face plate 12, the unit embodying face plate 12 and annulus 28 is frit sealed or otherwise fused at 30 to the tube envelope.

Prior to forming luminescent screen 16 upon the fiber structure of face plate 12, the side 20 thereof which is to receive screen 16 (see FIG. 2) is provided with an optical finish by grinding and polishing so as to prevent light scatter and diffusion. It is also preferable in practically all cases, that the opposite light-emitting side 22 of the fiber structure be similarly optically finished.

Figure 3:
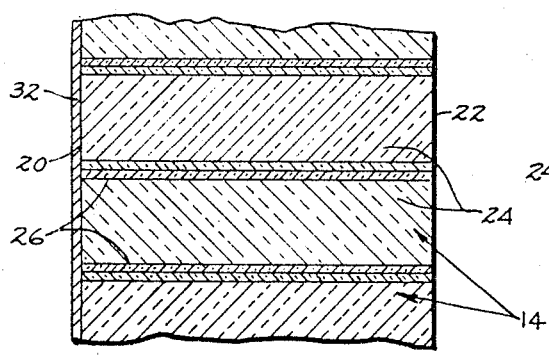
FIGS. 3–7 are views similar to FIG. 2 which illustrate successive steps in the process of applying a luminescent screen to the fiber optical structure of FIGURE 2.

Side 20 of the fiber optical structure is next rendered electrically conductive by applying thereto a thin coating 32 (see FIG. 3) of an electrically conductive material which is transparent and will not appreciably affect the light-receiving and light-conducting capabilities of fibers 14. Coating 32 may, for example, be formed by evaporated gold on the surface. Alternatively, a suitable metallic oxide such as stannous oxide or the like may be used. Preferably, it should be of a thickness such that it has a resistivity in the range of from approximately 100 to 1000 ohms per square. A stannous oxide coating of this character may be formed by spraying or otherwise similarly applying a stannous chloride solution to side 20 of the fiber optical structure drying and firing the same at a temperature sufficient to oxidize the stannous chloride and thereby form the oxide coating. Regardless of the particular manner used for forming the conductive coating, it should be essentially transparent.

After the fiber optical structure has been provided with coating 32, a continuous photosensitive layer 34 (see FIG. 4) is applied substantially uniformly to the coating 32 by any convenient technique such as squeegee application, knife coating, settling or spin coating. Layer 34 is preferably formed to a thickness approximately equal to that desired of the finished screen 16. Screen 16 is preferably no thicker than a fiber 14 diameter so that a minimum of lateral light-spreading will occur at each excitation spot therein. Layer 34 should be electrically insulating and be hardenable when exposed to actinic light (i.e. light within the ultra-violet and blue region of the spectrum or within the range of from approximately 3500 angstroms to 5000 angstroms). Where not exposed to such light, layer 34 is easily removable with a suitable solvent.

Various photosensitive compositions having the above-mentioned characteristics and which are suitable for carrying out the process of this invention are commercially available. These are known to the trade as organic photoresists and solvents therefor which are referred to in the trade as "developers" are usually supplied with the photoresist.

By way of example, a suitable photosensitive medium for use in forming layer 34 might comprise a water soluble polyvinyl alcohol containing predetermined amounts of ammonium or potassium dichromate to render it photosensitive. It may be prepared as follows:

A polyvinyl alcohol-water solution in the proportions of from 3 to 10 grams of highly water soluble polyvinyl alcohol dope thoroughly mixed in 100 cc. water is first prepared. In approximately 100 cc. of the above polyvinyl alcohol-water solution, from .1 to .5 gram of either ammonium dichromate or potassium dichromate is added and thoroughly mixed with the polyvinyl alcohol-water solution. If the mixture is to be applied by knife coating, it should be of a heavier consistency than would normally be used if it were intended to be flowed onto the fiber structure. In all cases, however, it should be of such viscosity as to remain in place on the fiber structure. Variations in the above proportions of water to polyvinyl alcohol may be used to control the resultant viscosity of the layer 34.

In the above composition, carboxy methyl cellulose (C.M.C.) may be directly substituted in a 1 for 1 ratio for the polyvinyl alcohol.

Figure 4:
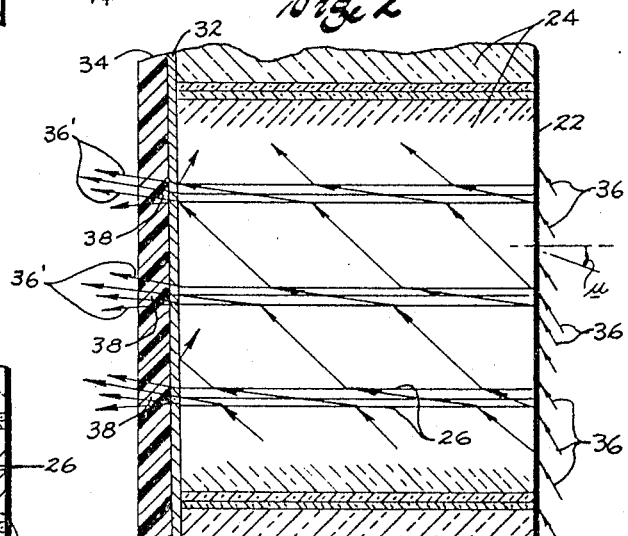

After having applied layer 34 to the fiber structure by any one of the above-mentioned techniques, collimated actinic light is directed upon side 22 thereof as indicated by the arrows 36 in FIG. 4. Light rays 36 are directed obliquely onto the fiber optical structure at angles relative to the plane of side 22 which are beyond the maximum light acceptance angle of each fiber. Thus, substantially, only the claddings 26 of fibers 14 become illuminated and conduct said actinic light to side 20 of the fiber optical structure. The maximum light acceptance angle or numerical aperture of the fiber optical structure is illustrated in FIG. 4 and is determined by the well known relationship $\sin u = n_1^2 - n_2^2$ wherein $u$ represents the aperture half angle, $n_1$ represents the index of refraction of the core glass 24 of fibers 14 and $n_2$ represents the index of refraction of the cladding glass 26 of fibers 14. By so directing the light, the rays thereof impinging upon the respective end faces of fibers 14 will, upon entering the core and cladding glasses, assume a much more forward direction in claddings 26 than in cores 24 substantially as illustrated in FIG. 4. Thus light 36 will emerge from cladding 26 at surface 20 with considerably more flux density. There will be less internal reflection at surface 20 of claddings 26 than from cores 24. A ratio of 5 to 1 or greater between emergent flux density of light between claddings 26 and cores 24 can readily be achieved. Consequently, the portions of layer 34 which overlie claddings 26 of fibers 14 will be sufficiently exposed to actinic light to cause them to become insoluble while the intermediate portions thereof which overlie cores 24 will be only negligibly exposed to said light. This is illustrated by arrows 36' in FIG. 4. Coating 32, being transparent, will not appreciably attenuate light-emerging from claddings 26.

Figure 5:
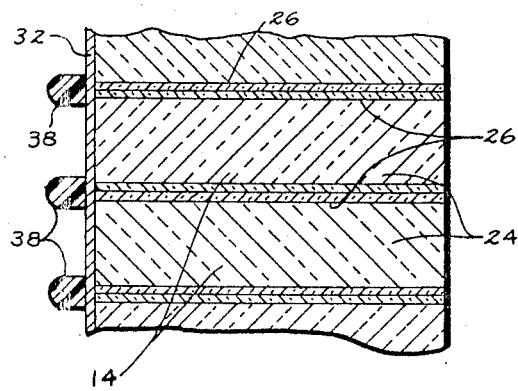

After having exposed layer 34 to light 36 in the above manner for a period sufficient to fully harden the same in areas which overlie claddings 26, the intermediate substantially unhardened areas of layer 34 are washed away or removed by a solvent so as to produce the mask-like configuration of hardened areas 38 shown in FIG. 5.

Where layer 34 is made up of polyvinyl alcohol, water and ammonium or potassium dichromate as set forth hereinabove, plain water is used as the solvent and an exposure time of from ½ to 6 minutes to actinic light from a conventional photoflood lamp which has a color temperature of approximately 3200° Kelvin. Approximately ⅓ of a watt/sq. in. on the surface 22 of the fiber optical structure is sufficient to properly harden areas 38 when layer 34 is of a thickness equal to or less than a fiber diameter and when the fiber optical structure is, for example, approximately ¼ of an inch in thickness (i.e. when fibers 14 are approximately ¼ of an inch in length).

The fiber optical structure now having the hardened areas 38 of photoresist as illustrated in FIG. 5 is immersed in an ionized electrolyte 40 in which phosphor particles 42 are suspended.

Figure 6:
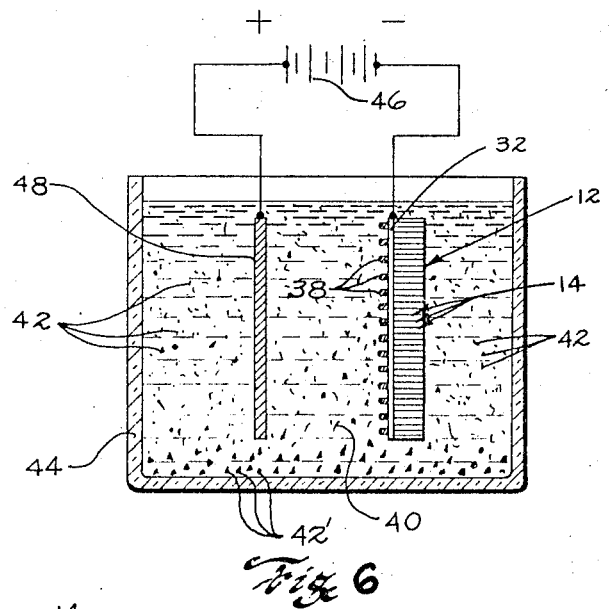

Phosphor particles 42 are selected from the many varieties thereof presently used in the fabrication of commercial cathode ray tube screens and are preferably sifted or ground to be smaller than the cross-sectional size of the ends of fibers 14. Larger phosphor particles 42' which may inadvertently become introduced into electrolyte 40 will automatically settle to the bottom of container 44 (FIG. 6) leaving substantially only the smaller and more desirably sized particles 42 in suspension.

The electrolyte 40 is preferably thorium nitrate in a supporting medium of alcohol or a similar agent which, in itself is substantially non-conductive and capable of dissolving the thorium nitrate.

Figure 7:
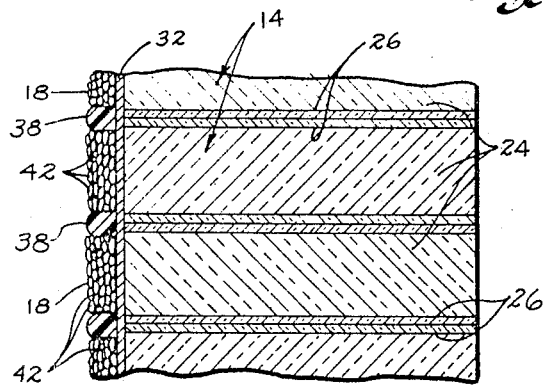

Once suspended in the electrolyte 40, phosphor particles 42 take on a positive surface charge. The conductive coating 32 on face plate 12 is electrically connected as a cathode to a 200 to 300 volt source of current 46 and an anode 48 positioned in adjacent relation thereto (see FIG. 6). With the above-mentioned voltage, a spacing of from 1 to 2 cm. between coating 32 and anode 48 should be provided. In this manner of directing electrical energy through electrolyte 40, the phosphor particles 42 are attracted to the negatively charged exposed portions of coating 32 in such manner as to produce by electrophoresis, a firm and densely packed deposit upon coating 32 between each of the areas 38 of the hardened photoresist material 34 as shown in FIG. 7. As it can be seen in the drawings, phosphor deposits 18 which are separated from one another are formed on face plate 12 in accurately registered coaxial relation with respective cores 24 of fibers 14. The spacings between deposits 18 of phosphor correspond to the areas of the claddings 26 where the photoresist material functions as a mask and insulator during the depositing of phosphor particles. No deposition occurs in such areas.

Figure 8:
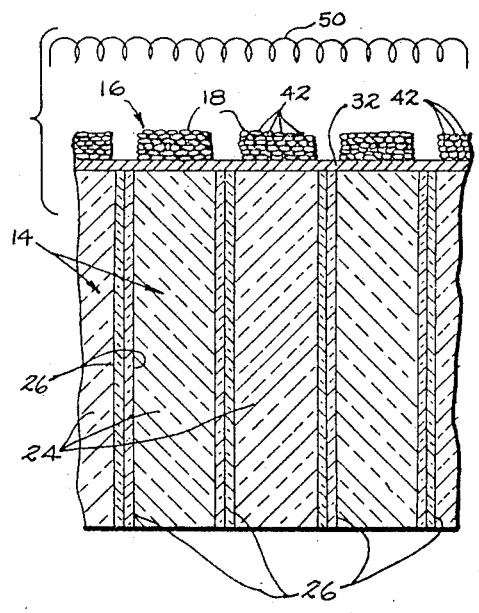
FIG. 8 is a greatly enlarged fragmentary cross-sectional view taken on line 8—8 in FIG. 1.

Following treatment in the electrolyte 40, face plate 12 is removed, dried and baked for a period of from 20 to 30 minutes at a temperature of from 400 to 420 degrees centigrade by any suitable means such as a heating coil 50 or the like which is diagrammatically illustrated in FIG. 8. This burns off the areas 38 of hardened photoresist material and causes phosphor particles 42 to adhere firmly to each other and to coating 32 on face plate 12.

With the resultant face plate 12 in assembled relation with a cathode ray tube 10 as shown in FIG. 1 and with tube 10 operating an electron from stream 19 which strikes an penetrates into a particular phosphor deposit 18 causes the phosphor particles 42 therein to become luminescent and form an excitation spot having an intensity proportioned to the energy of the beam striking the spot. Substantially all of this light which is directed toward the particular fiber core 24 having the illuminated phosphor deposit passes through the transparent coating 32 into said core and on through the fiber by internal reflection to the light-emitting side 22 of face plate 12. Other light from the immediate area of the electron excitation spot will be diffused within the phosphor deposit 18 and nearly completely dissipated by absorption therein. Only minor amounts of such light will reach and exit through the outer boundaries of the particular phosphor deposit 18 and, of this small percentage of light which might find its way outwardly thereof, only a negligible portion thereof, if any, would reach another adjacent phosphor deposit to excite it to luminescence. Furthermore, even less will eventually find its way into the core of another fiber 14. Thus, the screen construction 16 of the present invention provides substantially complete isolation of image light produced adjacent each respective fiber core so that image light intended to be transmitted by a particular fiber is practically completely prevented from illuminating its cladding or other adjacent fibers. In this way, screen 16 provides face plate 12 with an image resolving power substantially equal to that of its fiber size. As pointed out hereinabove, coating 32, being transparent, has no appreciable effect upon the light-receiving and light-conducting characteristics of fibers 14. It also tends to improve the "sticking potential" of the screen by functioning to bleed off electrons in the phosphor. If coating 32 is directly connected to the cathode ray tube second anode, it will further improve the "sticking potential."

Figure 9:
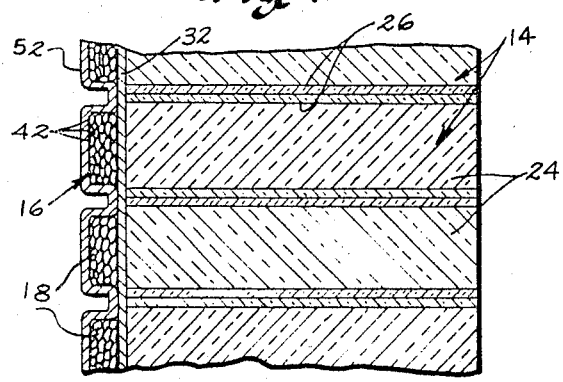
FIG. 9 is a view similar to FIG. 8 illustrating a modification of the invention.

As shown in FIG. 9, screen 16 may be provided with an all over thin coating of aluminum or the like 52 before or after making the assembly in FIG. 1. The aluminum coating 52 would be applied in the conventional manner in which cathode ray tube screens are aluminized. In addition to the usual and expected results of aluminizing phosphor screens, coating 52, in this particular instance, further functions to more completely isolate the phosphor deposits 18 and confine light produced therein to the immediate area of the fiber light-receiving face thereunder.

I claim:

1. The method of forming a face plate of the character described embodying a fiber optical structure formed of a plurality of light-conducting fibers bundled together in side-by-side relation and each having a core part of light-conducting material of relatively high index of refraction surrounded by a comparatively thin cladding of relatively low index light-conducting material with corresponding opposite ends of said fibers arranged to provide respective light-receiving and light-emitting opposite sides of said structure, said method comprising applying a thin transparent electrically conductive coating to a first side of said structure, providing a layer of photosensitive electrically insulating material over said coating, said material being characterized to become hardened by exposure to actinic light and readily removable from said coating where not appreciably exposed to such light, directing actinic light through substantially only said claddings of said fibers from said second side of said structure to cause exposure and hardening of said layer throughout portions thereof overlying said claddings adjacent said first side of said structure, removing remaining portions of said layer to expose said coating and applying a controlled thickness of particles of energy converters upon said exposed portions of said coating to form deposits thereof each in substantial registry with a respective core part of said fibers and with said deposits being separated from each other by amounts substantially corresponding to the thicknesses and configurations of said claddings.

2. The method of forming a face plate of the character described for use in a cathode ray tube wherein said face plate embodies a fiber optical structure formed of a plurality of light-conducting fibers bundled together in side-by-side relation and each having a core part of light-conducting material of relatively high index of refraction surrounded by a comparatively thin cladding of relatively low index light-conducting material with corresponding opposite ends of said fibers arranged to provide respective light-receiving and light-emitting opposite sides of said structure, said method comprising applying a thin transparent electrically conductive coating to a first side of said structure, providing a layer of photosensitive electrically insulating material over said coating, said material being characterized to become hardened by exposure to actinic light and readily removable from said coating where not appreciably exposed to such light directing actinic light through substantially only said claddings of said fibers from said second side of said structure to cause exposure and hardening of said layer throughout portions thereof overlying and corresponding to the configurations of said claddings adjacent said first side of said structure, removing remaining substantially unexposed portions of said layer, applying a controlled thickness of phosphor particles upon said exposed portions of said coating to form deposits thereof each in substantial registry with a respective core part of said fibers and with said deposits being separated from each other by amounts substantially corresponding to the thicknesses and configurations of said claddings and removing said portions of said layer from between respective deposits of particles.

3. The method of forming a face plate of the character described embodying a fiber optical structure formed of a plurality of light-conducting fibers bundled together in side-by-side relation and each having a core part of light-conducting material of relatively high index of refraction surrounded by a comparatively thin cladding of relatively low index light-conducting material with corresponding opposite ends of said fibers arranged to provide respective light-receiving and light-emitting opposite sides of said structure, said method comprising applying a thin transparent metallic coating to a first side of said structure, providing a continuous layer of photosensitive electrically insulating material over said coating, said material being characterized to become hardened by exposure to actinic light and readily removable from said coating where not appreciably exposed to such light, directing actinic light through substantially only said claddings of said fibers from said second side of said structure to cause exposure and hardening of said layer throughout portions thereof overlying said claddings adjacent said first side of said structure, removing remaining substantially unexposed portions of said layer, placing said face plate in an electrolyte having positively charged phosphor particles suspended therein, electrically connecting said coating as a cathode in said electrolyte, directing an electrical charge through said electrolyte and said coating by the provision of an anode disposed adjacent said face plate to cause a number of said phosphor particles to deposit on said coating by electrophoresis throughout portions thereof between said hardened insulating material.

4. The method of forming a face plate of the character described for use on a cathode ray tube wherein said face plate embodies a fiber optical structure formed of a plurality of light-conducting fibers bundled together in side-by-side relation and each having a core part of light-conducting material of a preselected relatively high index of refraction surrounded by a comparatively thin cladding of light-conducting material having a preselected relatively low index of refraction with corresponding opposite ends of said fibers being arranged to provide respective light-receiving and light-emitting opposite sides of said structure each having a maximum light-acceptance angle for transferring light through said core parts of said fibers determined by relative values of said refractive indices of said core and cladding materials, said method comprising applying a thin transparent metallic coating to a first side of said structure, applying a continuous layer of photosensitive electrically insulating material over said coating, said material being characterized to become hardened by exposure to actinic light and readily removable from said coating where not appreciably exposed to such light, directing actinic light upon said second side of said structure at angles beyond said maximum light-acceptance angle so as to cause substantially only said claddings of said fibers to convey said light to said first side of said structure and expose the same to bring about hardening of said layer substantially only throughout portions thereof overlying said claddings, removing remaining portions of said layer, placing said face plate in an electrolyte having positively charged phosphor particles suspended therein, electrically connecting said coating as a cathode in said electrolyte and directing an electrical charge through said electrolyte and said coating by the provision of an anode disposed adjacent said face plate to cause a number of said phosphor particles to become deposited on said coating by electrophoresis throughout portions thereof between said hardened insulating material and removing said hardened portions of said layer from between respective deposits of said phosphor particles.

5. The method of forming a face plate of the character described for use on a cathode ray tube wherein said face plate embodies a fiber optical structure formed of a plurality of light-conducting fibers bundled together in side-by-side relation and each having a core part of light-conducting material of a preselected relatively high index of refraction surrounded by a comparatively thin cladding of light-conducting material having a preselected relatively low index of refraction with corresponding opposite ends of said fibers being arranged to provide respective light-receiving and light-emitting opposite sides of said structure each having a maximum light-acceptance angle for transferring light through said core parts of said fibers as determined by relative values of said refractive indices of said core and cladding materials, said method comprising applying a thin transparent metallic coating to a first side of said structure, applying a continuous layer of photosensitive electrically insulating material over said coating, said material being characterized to become hardened by exposure to actinic light and readily removable from said coating where not appreciably exposed to such light, directing actinic light upon said second side of said structure at angles beyond said maximum light-acceptance angle so as to cause substantially only said claddings of said fibers to convey said light to said first side of said structure and expose the same to bring about hardening of said layer substantially only throughout portions thereof overlying said claddings, removing remaining portions of said layer, placing said face plate in an electrolyte having positively charged phosphor particles suspended therein, electrically connecting said coating as a cathode in said electrolyte and directing an electrical charge through said electrolyte and said coating by the provision of an anode disposed adjacent said face plate to cause a number of said phosphor particles to become deposited on said coating by electrophoresis throughout portions thereof between said hardened insulating material and heating said face plate to a temperature sufficient to burn off said hardened portions of said layer from between respective deposits of said phosphor particles and to cause said particles to adhere to each other and to said coating.

6. The method of forming isolated deposits of coating material on a surface of an energy-conducting fiber structure, said surface being comprised of the corresponding one ends of a number of energy-conducting fibers secured together in spaced side-by-side relation with each other by a transparent material, said method comprising the steps of applying a thin transparent layer of electrically conductive material to said surface of said structure, applying a substantial thickness of an electrical insulating photoresist over said layer of electrically conductive material, directing actinic light through said transparent material between said fibers to expose and harden said photoresist substantially only in areas thereof disposed over said transparent material, removing remaining portions of said photoresist to expose isolated areas of said electrically conductive layer disposed over said one ends of said fibers, placing said surface of said structure in a medium containing a suspension of particles of said coating material each having an electric charge of one polarity and applying an electric charge of opposite polarity to said layer of electrically conductive material to attract and cause a substantial number of said particles to deposit on said isolated areas of said layer.

References Cited

UNITED STATES PATENTS

| | | | |
|---|---|---|---|
| 3,231,380 | 1/1966 | Law | 204—181 |
| 3,094,477 | 6/1963 | Jackson et al. | 204—181 |
| 3,139,340 | 6/1964 | Hays et al. | 313—92 |
| 3,198,634 | 8/1965 | Payne | 117—33.5 |
| 3,255,003 | 6/1966 | Hays | 313—92 |
| 2,996,634 | 8/1961 | Woodcock | 313—92 |
| 2,985,784 | 5/1961 | MacNeille | 313—92 |
| 2,376,047 | 5/1945 | Roscoe | 204—181 |
| 2,442,863 | 6/1948 | Schneider | 204—181 |

FOREIGN PATENTS

| | | |
|---|---|---|
| 634,702 | 3/1950 | Great Britain. |
| 655,032 | 7/1951 | Great Britain. |

ROBERT K. MIHALEK, *Primary Examiner.*

JOHN H. MACK, JOHN R. SPECK, *Examiners.*

E. ZAGARELLA, J. BATTIST, *Assistant Examiners.*